United States Patent [19]

Springer

[11] Patent Number: 4,625,313
[45] Date of Patent: Nov. 25, 1986

[54] METHOD AND APPARATUS FOR TESTING ELECTRONIC EQUIPMENT

[75] Inventor: Richard A. Springer, Tualatin, Oreg.

[73] Assignee: Tektronix, Inc., Beaverton, Oreg.

[21] Appl. No.: 628,191

[22] Filed: Jul. 6, 1984

[51] Int. Cl.[4] .............................................. G01R 31/28
[52] U.S. Cl. ........................................ 371/20; 371/16; 371/24
[58] Field of Search ...................... 371/16, 20, 24, 25; 324/73 R, 73 AT, 73 PC

[56] References Cited

U.S. PATENT DOCUMENTS

| | | | |
|---|---|---|---|
| 3,519,808 | 7/1970 | Lawder | 371/16 X |
| 3,761,695 | 9/1973 | Eichelberger | 371/25 |
| 4,194,113 | 3/1980 | Fulks et al. | 371/20 |
| 4,312,067 | 1/1982 | Shirasaka | 371/25 |
| 4,317,200 | 2/1982 | Wakatsuki et al. | 371/25 |
| 4,455,654 | 6/1984 | Bhaskar et al. | 371/20 |
| 4,476,431 | 10/1984 | Blum | 324/73 R |
| 4,493,078 | 1/1985 | Daniels | 371/25 |
| 4,503,386 | 3/1985 | DasGupta et al. | 324/73 R |
| 4,519,078 | 5/1985 | Komonytsky | 371/25 |
| 4,534,028 | 8/1985 | Trischler | 371/25 |

OTHER PUBLICATIONS

Anderson et al., Processor-Based Tester Goes on Site to Isolate Board Faults Automatically, Electronics, May 11, 1978, pp. 111–117.
Field-Service Tester Steps Technicians through Test Paces, Electronics, Feb. 16, 1978, pp. 41–42.

Primary Examiner—Charles E. Atkinson
Attorney, Agent, or Firm—William S. Lovell; John Smith-Hill; Robert S. Hulse

[57] ABSTRACT

A microprocessor-based apparatus for testing the electrical condition of electronic circuitry, particularly computers, employs a buffer and a latch associated with each of the address bus and the data bus to provide electrical isolation of said buses. In using the apparatus, the integrity of a central testing "kernel" comprising the testing program itself with its testing data in ROM is first verified. The testing program then evaluates, in order, the data bus, the address bus, and then such additional and addressable circuitry as may be connected to said data bus and address bus. Incorporation of analog-to-digital converters permits determination of actual circuit node voltages, in addition to digital levels or the presence of open or short circuits.

8 Claims, 5 Drawing Figures

METHOD AND APPARATUS FOR TESTING ELECTRONIC EQUIPMENT

BACKGROUND OF THE INVENTION

The present invention relates generally to the testing and measurement of sub-systems of electronic equipment, and particularly to the testing of microprocessor-controlled systems, for the purpose of identifying faulty components of the subsystems and verifying their operation after manufacture or repair.

As modern electronic equipment becomes more and more complex, so too have the methods by which its operation is tested. Testing may be done by factory personnel (for quality control purposes) at the time of manufacture, by service technicians at the time of routine maintenance and repair, and by users in the course of operating the equipment. In microprocessor-based systems, there may exist means for "self-testing". Certain diagnostic procedures may be carried out automatically upon power-up, or upon user demand.

In digital systems under microprocessor control, one may identify four types (levels) of testing that are commonly carried out: two levels of automatic testing, and two levels of manual testing. At one level of automatic testing, (the program level), there may exist, either in software or firmware, a monitor or other routine such as a debugging program including error-trapping routines which generate diagnostic messages upon finding a systems error or fault condition. However, such messages often do not distinguish between program error and circuit/hardware fault.

At another level of automatic testing (the logic state level), concern is with the bit flow relative to the system clock, and with specified bit patterns. Selected patterns (both stimulus and response patterns) may be either pre-stored or generated algorithmically. Examination of such bit patterns constitutes a data domain analysis, and may be carried out using either an external digital or logic state analyzer, or circuits which perform somewhat similar functions within the system itself. Like program testing, however, data domain analysis provides only limited information, insufficient to pinpoint the causes of erroneous bits that may appear in a response pattern.

One manual type of testing, (e.g., testing using a digital probe at selected circuit nodes) is used to indicate faulty logic conditions (ones and zeroes) in a circuit. Such testing is not limited to points that may have been addressed in a pre-programmed analysis (automatic testing data domain analysis), but may be extended to test specific transistors, resistors or capacitors. This testing may be done while the system (equipment) is operating, as in the case of a program or data domain analysis, or not operating (e.g., operation may have been suspended and a local "operation" simulated using a digital pulser). In either case, manual testing is usually performed following a prescribed trouble-shooting sequence, in order to identify faulty circuits and, ultimately, one or more faulty components, so that repair or replacement can be carried out.

Another manual type of testing is DC voltage testing, in which logical operations are ignored, and DC voltages are applied and examined. For example, if digital probing revealed a faulty logic condition indicative of a faulty voltage level, the above-mentioned trouble-shooting sequence may call for a testing for leaky transistors or capacitors at a predetermined site with a voltmeter.

What is needed and would be useful, therefore, is a test system/method which would automate digital probe testing and DC voltage testing.

SUMMARY OF THE INVENTION

The present invention provides a means for testing the components of an electronic system automatically, obviating the need for manual digital probe testing and DC voltage testing. More particularly, the present invention provides a means for measuring, under microprocessor control, voltages at specific nodes in an electronic circuit, in order to test the operation of equipment containing that circuit, whether digital or analog. The invention comprises a microprocessor or a portion (subsystem) thereof, read-only memory (ROM), a buffer and a latch, all of which define a central "kernel", including an addressing capability. The buffer provides isolation of the circuit component under test. The latch acts as a state machine in determining the state of the component so isolated. The ROM may contain either a look-up table or pre-determined stimulus and response data, or one or more algorithms for generating such stimulus and response data. In cases where the equipment ordinarily contains a microprocessor, a particular subset of its instructions may be employed for purposes of functional control of such measurements. In other cases, a microprocessor especially designed for the purpose of such control may be added to the equipment.

The method of testing employed by the invention includes the steps of first testing the kernel itself, and then any buses connected to the kernel. The method then tests in sequence those components of the circuitry for which addressing has been provided in order to determine their voltage states, and then compares the levels so obtained with the expected levels derived from the ROM, so as to test the circuit operation. In a more detailed embodiment of the invention, the addition of analog-to-digital converters (ADC's) to the kernel in order to form a voltage comparator allows the testing of specific voltage values at selected, addressable circuit nodes. In that case, the reference data derived from the ROM comprises nominal voltage values, or acceptable ranges thereof, as would be expected in properly functioning equipment.

DETAILED DESCRIPTION OF THE PREFERRED EMBODIMENT

Figure 1A:
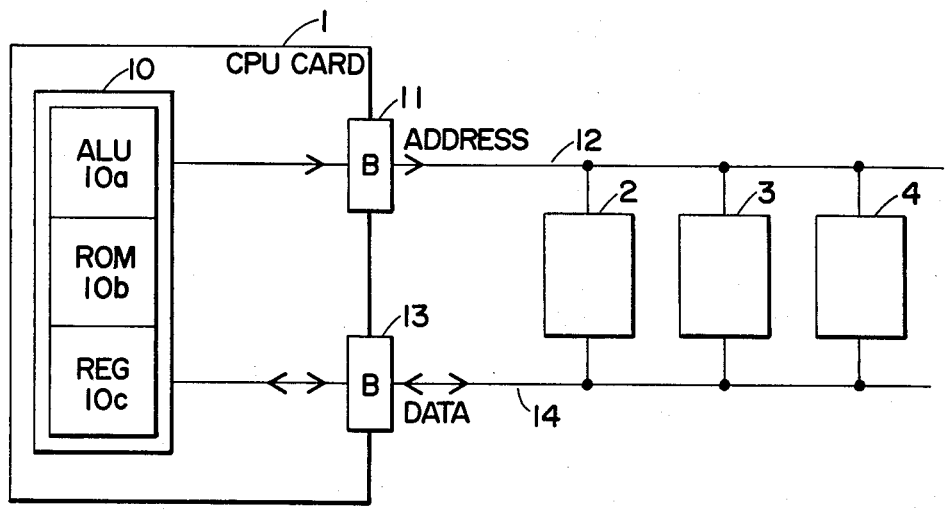
FIG. 1A is a block diagram showing a microprocessor-controlled system of the prior art.

In FIG. 1A there is shown a conventional CPU card 1 comprising a microprocessor 10 including an arithmetic-logic unit (ALU) 10a, read-only memory (ROM) 10b and registers 10c, together with address buffer 11 leading to address bus 12 and data buffer 13 leading to data bus 14. Also shown are cards 2, 3 and 4 which will typically connect through a backplane (not shown) to address bus 12 and data bus 14. Cards 2, 3 and 4 will typically contain random-access memory (RAM), disk or CRT controllers, or similar circuitry necessary to carry out other functions in computer or other electronic equipment. Some of such circuitry may also be mounted directly on the CPU card. A control bus (not shown) interconnects the several cards. Said control bus connects through a control buffer (not shown) which provides electrical isolation thereof. Display or indicating means (not shown) must also be provided in order that the results of the testing procedures, as well as the operation of the equipment itself, may be observed.

Address buffer 11 and data buffer 13 ordinarily serve the purpose of driving digital signals onto the respective address bus 12 and data bus 14, on which there may exist a large fan-out requiring substantial power. Data buffer 13 will also be configured to transfer digital signals from the data bus 14 back through to the microprocessor 10. The ROM 10b contains the microencoded instructions which will carry out these several addressing and data read/write functions derived from some program source (not shown), which may be additional ROM or RAM.

In operation, or upon manufacture, it may occur that one or more of the cards 2, 3 and 4 will develop a malfunction which will prevent proper operation of the equipment. As noted earlier, there may be conveyed to the ROM 10b, and under the control of an external or internal digital clock (not shown), a set of instructions particularly designed for testing the system operation. However, a malfunction in any of microprocessor 10, address buffer 11, address bus 12, data buffer 13 or data bus 14 could prevent such a testing routine from being carried out. Furthermore, in the prior art configuration of FIG. 1A, without disconnecting components there would be no way of determining in which of said components the malfunction had occurred. It is principally this difficulty that the present invention solves.

Figure 1B:
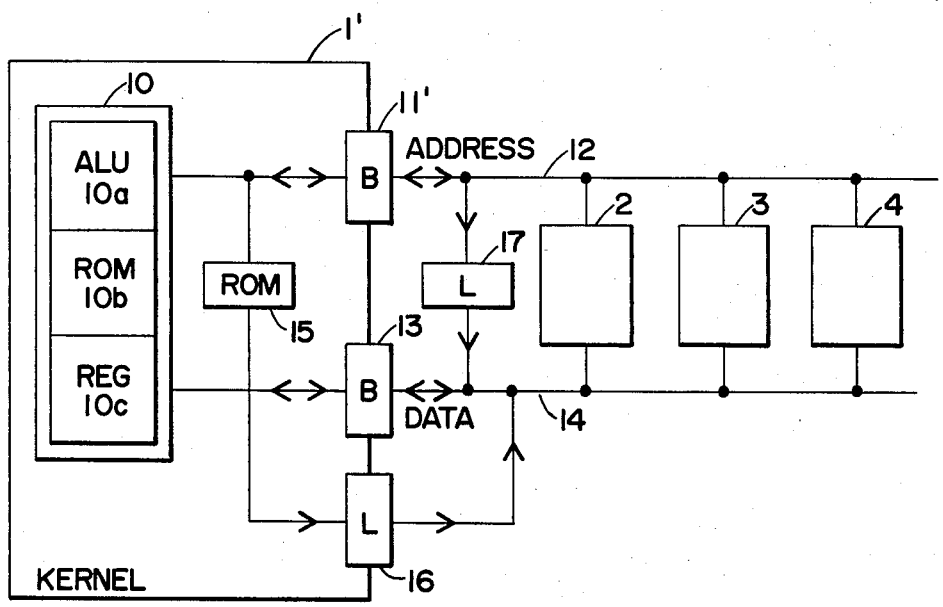
FIG. 1B is a block diagram showing a microprocessor-controlled test system of the present invention.

FIG. 1B then shows a modified card 1' and associated components which embody the invention. Corresponding component numbers in FIGS. 1A and 1B have the same meaning. However, the unidirectional address buffer 11 of FIG. 1A may be modified in the invention to form the bidirectional address buffer 11' of FIG. 1B. Address buffer 11' and data buffer 13 will then be of the same bidirectional type. By such change, the devices on cards 2, 3 or 4 are enabled to address the ROM 15, as in the case of a DMA controller seeking control information.

The embodiment of the invention shown in FIG. 1B also adds an additional ROM 15 and the latches 16 and 17. Use of the additional ROM 15 allows for the storage or generation of extensive test data, as will be described further below, without overtaxing the microprocessor ROM 10b. The additional ROM 15 also allows for greater design flexibility in that it may be field programmable, or alternate versions thereof may be provided, either by switching between such alternate versions all mounted on the CPU card 1', or by interchanging various ROM chips 15 in a single mount. The further addition of data latch 16 and address latch 17, which comprise essentially D latches having an additional, three-level output enable circuit, then allows the method of the invention to be carried out. As will be noted further below, address latch 17 also incorporates means for selecting individual address cycles out of the bit flow on address bus 12.

Figure 2:
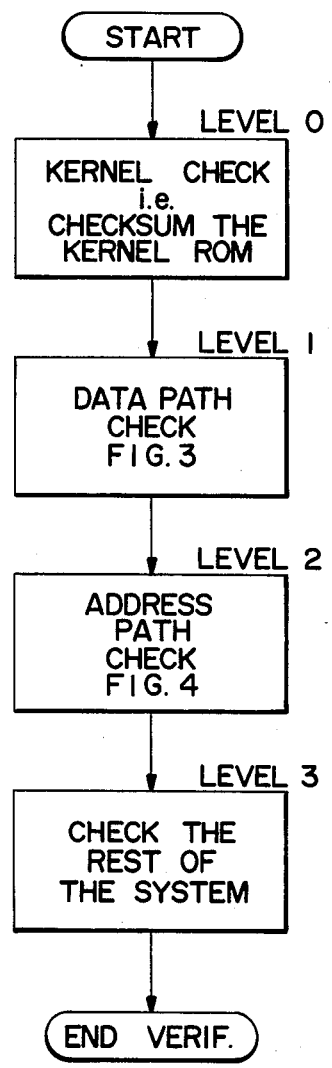
FIGS. 2–4 constitute flow charts illustrating the method of the invention.

Operation of the circuit of FIG. 1B for test purposes then centers around the use of a "kernel" comprising the microprocessor 10, the additional ROM 15, and the sides of address buffer 11', data buffer 13 and data latch 16 which face said ROM 15. Such operation is made possible in part by an additional feature of address buffer 11' and data buffer 13 (as well as the control buffer, not shown). While ordinarily used simply as bus drivers because of their power capabilities, these buffers also act to isolate the devices which they interconnect. In the present case, they respectively isolate the kernel from the address bus 12 and the data bus 14 (and said control bus). The data latch 16 provides similar isolation. The kernel itself may then be tested in isolation, and so too may be the individual buses and as many of the remaining circuit components as may be individually addressed. A sequence of tests that may be conducted is shown in FIG. 2.

As noted, the "level 0" test of the kernel may amount simply to a checksum of the kernel ROM 15. That simplicity results because the kernel has been reduced to a minimum number of parts. If such a test performs correctly, the microprocessor 10 will be functioning properly, the kernel ROM 15 will have been properly programmed, and there will exist no short or open circuits within either the microprocessor 10, the kernel ROM 15, or the wiring which interconnects these devices. Similarly, there will exist as least no short circuits within the input sides of address buffer 11', data buffer 13, or data latch 16 (or of the control buffer, not shown) or the wiring leading thereto. The remaining tests can then be carried out, using the appropriate latches and buffers in each case.

In testing address bus 12 or data bus 14, the method of the invention will typically transfer a particular data pattern to the address latch 17 or the data latch 16, respectively, and then determine whether the data pattern so transferred may be recovered intact from the latch into which it was placed. In testing any additional circuitry that is connected to the address bus and data bus, a data pattern may be transferred as a stimulus to one set of addressable points, and then a response data pattern so caused may be taken from a different set of addressable points, all of said points being located within the particular circuit or sub-circuit then under test.

Figure 3:
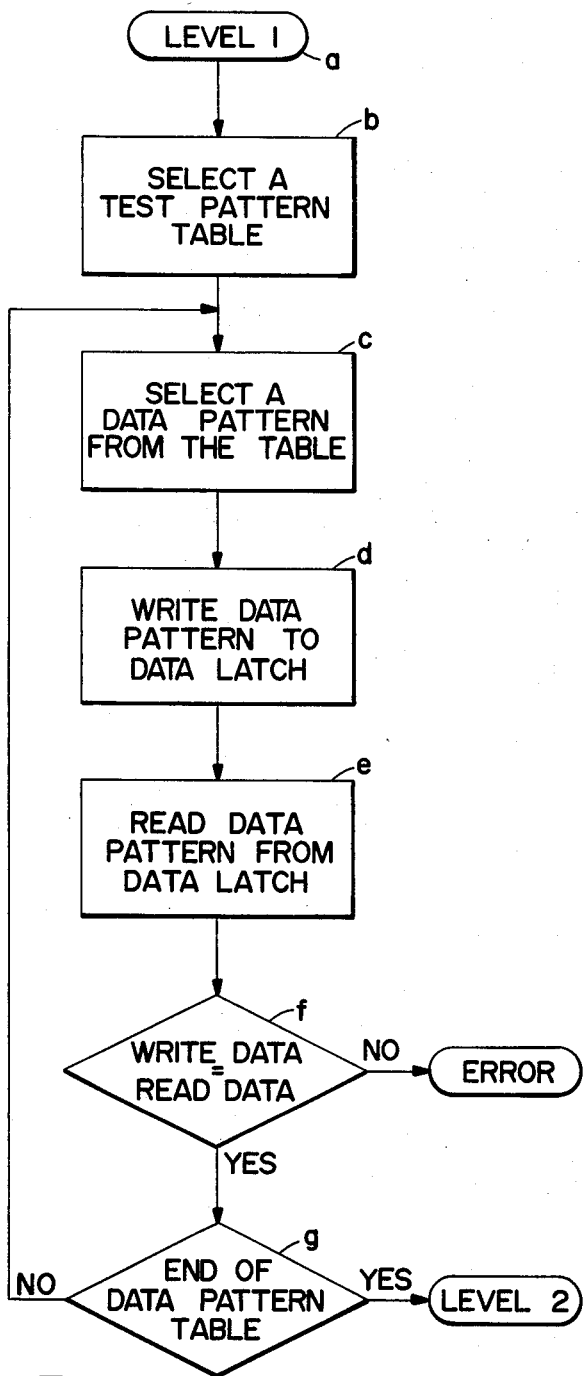

Thus, the subsequent "level 1" test, as shown in more detail in FIG. 3, may be seen to involve the use of data latch 16 and data buffer 13 in addition to the microprocessor 10 and the kernel ROM 15. A particular table of bit patterns within the kernel ROM 15 may be designated as appropriate to this level 1 test, and the microprocessor 10 will then first select such a level 1 test pattern table within the kernel ROM 15. From that table, the microprocessor 10 will also select a particular data pattern and write it into the data latch 16. That data pattern will then be read back into the microprocessor 10 through the data buffer 13. A correct match to the original data pattern will then indicate that there exist no open or short circuits on the kernel sides of data latch 16 or data buffer 13, nor any open or short circuits within those parts of data latch 16 or data buffer 13 which lie outside of the kernel. To establish the entirety of that information, there may exist within the kernel ROM 15 a sequence of test patterns which may be employed successively as noted in FIG. 3. Such test patterns will of course be designed to pinpoint the individual bit line or lines within which a malfunction occurs.

As can be seen in FIG. 1B, the level 1 test also requires the use of data bus 14, or at least connection thereto. A successful test will indicate that there are no short circuits in data bus 14, nor indeed in any of the components of cards 2, 3 or 4 which connect directly to data bus 14. If a short does appear, it will be necessary as in the case of the prior art to begin removing cards in order to pinpoint the origin of the short, i.e., within data bus 14, the backplane (not shown), or within one of such cards. During such testing, the kernel itself will continue to function properly as before. Consequently, unlike the prior art, in this case the particular bit line or lines in which the short occurs will be known. It will also be known that the address bus 12 or the components of cards 2, 3 or 4 which connect directly to address bus 12 (or indeed any of such components except those connecting to data bus 14) will not be involved.

Figure 4:
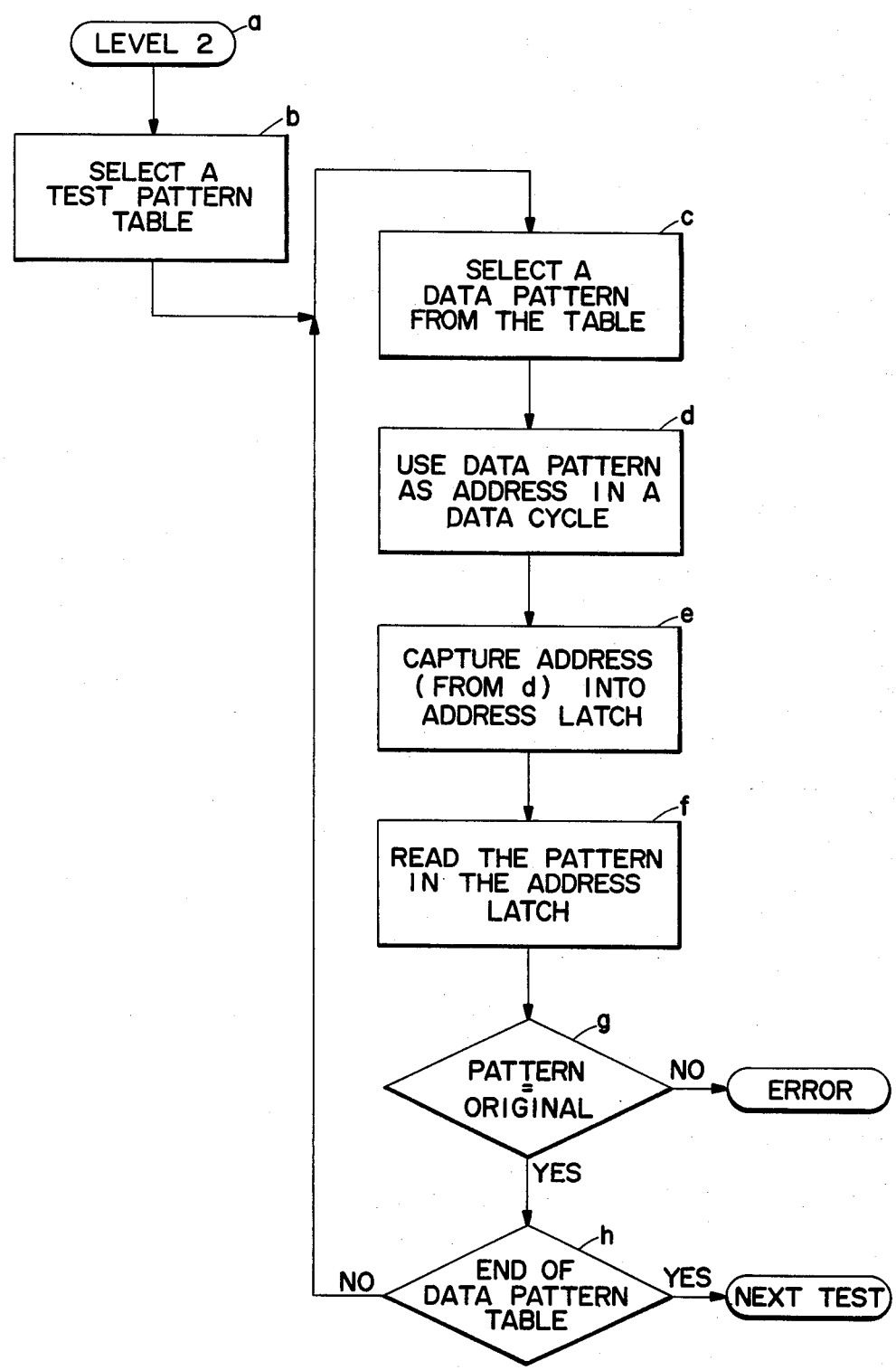

In a very similar fashion, the address bus 12 and its associated components are tested at level 2 as shown in FIG. 4. However, since a microprocessor such as 10 is not ordinarily configured to write out and read in addresses as it would data, it is necessary to use the data bus 14 and its associated components in order to carry out the level 2 test of the address circuitry. It is for that reason, of course, that the level 1 test of the data circuitry is conducted first. Specifically, after a particular test pattern has been selected by the microprocessor 10 as before, and as now shown in FIG. 4, the address latch 17 will be used to bring data from the address bus 12 across to the data bus 14. As in the previous case of the level 1 test outlined in FIG. 3, said data will then be transmitted through the data buffer 13 to the kernel ROM 15 for comparison to the original data pattern.

When executing the instructions of a program, microprocessor 10 will ordinarily proceed through a series of data and fetch cycles, the addresses for which will appear on address bus 12. In carrying out the level 2 test, microprocessor 10 will cycle through a series of bit patterns derived from the kernel ROM 15, and said bit patterns will likewise be reflected on address bus 12. In the method of the level 2 test, said bit patterns are treated as addresses, and are captured as such on selected data cycle by address latch 17. Said treatment and capture of said bit patterns, though conceptually distinguishable and being shown as so distinguished in steps d and e of FIG. 4, may in fact be executed by a single set of instructions. When a particular bit pattern has been so captured, it is then read from the address latch 17 through the data buffer 13 and compared to the original data pattern in the manner of the level 1 test shown in FIG. 3.

In Table 1 below there is then set forth a series of assembly language instructions applicable to the particular case of the M68000 microprocessor which will carry out the level 1 and level 2 tests, respectively. Since the assembly language mnemonics are quite general, the procedure is clearly adaptable to other microprocessors. It should also be mentioned here that in the case of a microprocessor system which employs only a single, multiplexed bus (other than the control bus), said multiplexed bus would correspond to the data bus 14 of FIG. 1B. In the same figure, address buffer 11', address bus 12 and address latch 17 would then be superfluous, and there would occur no test corresponding to the level 2 test of the present case.

TABLE 1

|        |      | Test level 1 (FIG. 3) | a |
|--------|------|-----------------------|---|
|        | LEA  | Test_pattern, A0      | b |
| LOOP1: | MOVE | (A0)+, D0             | c |
|        | MOVE | D0, DATA_LATCH        | d |
|        | MOVE | DATA_LATCH, D1        | e |
|        | CMP  | D0,D1                 | f |

TABLE 1-continued

|        |      |                      |     |
|--------|------|----------------------|-----|
|        | BNE  | ERROR                |     |
|        | CMP  | #ENDTEST,A0          | g   |
|        | BNE  | LOOP1                |     |
|        |      | ;TO NEXT TEST LEVEL  |     |
|        |      | Test level 2 (FIG. 4)| a   |
|        | LEA  | Test_pattern,A0      | b   |
| LOOP2: | MOVE | (A0)+,D0             | c   |
|        | MOVE | #0,SETUP             | d,e |
|        | MOVE | D0,A1                |     |
|        | MOVE | (A1),D1              |     |
|        | MOVE | ADRS_LATCH,D2        | f   |
|        | CMP  | D0,D2                | g   |
|        | BNE  | ERROR                |     |
|        | CMP  | #END_TEST,A0         | h   |
|        | BNE  | LOOP2                |     |
|        |      | ;TO NEXT TEST LEVEL  |     |

Successful completion of the testing at levels 0, 1 and 2 then establishes that the kernel, the associated buffers and latches, and address bus 12 and data bus 14 are all functioning properly. In addition, there are no short circuits in any of the cards 2, 3 or 4 such as would short out either address bus 12 or data bus 14. That is the necessary condition for being able to carry out the logic state or data domain analysis mentioned earlier. Testing at levels 0, 1 and 2 alone requires a minimum investment in apparatus which may be incorporated into virtually any system.

A data domain analysis may also be conducted using the apparatus of the present invention, as shown in FIG. 1B, but employing the procedures of the prior art. None of either the kernel ROM 15, the data latch 16 or the address latch 17 need be involved in such prior art testing. Also, the fact that the unidirectional address buffer 11 of FIG. 1A may be changed to the bidirectional address buffer 11' of FIG. 1B will not affect the use of the latter in a unidirectional mode for such purpose. Programs written for use in the prior art configuration of FIG. 1A may then be employed in the configuration of the present invention shown in FIG. 1B with little or no change, and will thus constitute the level 3 test shown in FIG. 2. The difference which the present invention imposes is that at the time of such prior art testing, the electrical integrity of the buses to be employed will already have been independently confirmed. Such testing may show that there are no open circuits leading to cards 2, 3 or 4, and that they display correct digital patterns.

As noted earlier, a logic state analysis is ordinarily constrained to read only HI and LO voltage levels, which may then appear as 1's and 0's (or as disassembled equivalents thereof) in a video display. A digital probe, on the other hand, will often the configured to indicate "bad" or intermediate voltage levels as well, when said probe is touched to a circuit component that exhibits such a fault. In an additional embodiment of the present invention, the circuit of FIG. 1B may be modified to accommodate not only "bad" voltage levels, but also the actual voltage values existing at each addressable circuit node. That is accomplished by incorporating analog-to-digital converters (ADC's) to feed into the data buffer 13 and the address buffer 11', or at similar convenient locations. When using an ADC with a parallel output, one may reduce the number of lines leading on to the microprocessor 10 and any intervening components may also adding a parallel-to-serial converter to the output of each such ADC.

Use of the present method to replace fully the manual procedures set forth in the typical trouble-shooting routine for voltage testing would require a substantial increase in the addressing capability of the microprocessor 10 and the asssociated ROM. There would also be required an increase in the decoding capability at each of the cards 2, 3 or 4, and in the wiring of such cards to connect to the points of interest. At the same time, to carry out tests at levels 0, 1 and 2 requires the use of only a few instructions, of which the M68000 microprocessor, for example, includes some 56 basic types. Particularly in the case of electronic equipment that is entirely analog in nature, and would otherwise contain no digital circuitry, one may then employ a modification of the circuit of FIG. 1B in which the microprocessor 10 has been designed for testing purposes only. A very minimal need in terms of an instruction set then allows substantial expansion in terms of addressing capability.

It is then apparent that while the method and apparatus of the present invention have been described in terms of a particular embodiment, and with special reference to the M68000 microprocessor, the invention itself will be easily adaptable to other configurations, or to other microprocessors, by those having ordinary skill in the art. It will then be appreciated that the invention is not limited to the particular embodiments which have been shown or described, since variations may be made therein without departing from the scope of the invention, as defined in the appended claims or equivalents thereof. In particular, the present invention incorporates no limitations on such matters as the byte or word sizes which may be treated, the frequency of operation, or the microelectronic technology by which the apparatus may be implemented, and such variations thereon as may be conceived by those having ordinary skill in the art are to be presumed as being incorporated herein.

I claim:

1. Digital apparatus comprising:
a microprocessor;
a first address bus portion connected to said microprocessor;
a first data bus portion connected to said microprocessor;
digital memory connected between said first address bus portion and said first data bus portion;
a second address bus portion;
address buffer means which connect said first address bus portion to said second address bus portion, so as to isolate electrically said first address bus portion from said second address bus portion, but permitting the transfer of electrical signals at least from said first address bus portion to said second address bus portion;
a second data bus portion;
data buffer means which connect said first data bus portion to said second data bus portion, so as to isolate electrically said first data bus portion, but permitting the transfer of electrical signals both from said first data bus portion to said second data bus portion, and from said second data bus portion to said first data bus portion; and
data latch means which connect from said first data bus portion to said second data bus portion, so as to isolate electrically said first data bus portion from said second data bus portion, but permitting the capture by said data latch means of electrical signals at least from said first data bus portion and the application of captured electrical signals to said second data bus portion.

2. The apparatus of claim 1, further comprising address latch means which connect from said second address bus portion to said second data bus portion, so as to isolate electrically said second address bus portion from said second data bus portion, but permitting the capture by said address latch means of electrical signals from said second address bus portion, and further permitting the reading through said second data bus portion of the electrical signals so captured.

3. Digital apparatus comprising:
a microprocessor;
a first bus section connected to said microprocessor;
digital memory connected to said first bus section;
a second bus section;
buffer means which connect said first bus section to said second bus section, so as to isolate electrically said first bus section from said second bus section, but permitting the transfer of electrical signals both from said first bus section to said second bus section and from said second bus section to said first bus section; and
latch means which connect from said first bus section to said second bus section, so as to permit the capture of electrical signals from said first bus section and the application of captured electrical signals to said second bus section without use of the buffer means and while isolating electrically the first bus section from the second bus section.

4. Digital apparatus according to claim 3, wherein the first and second bus sections each comprise a portion of an address bus and a portion of a data bus, said buffer means comprise data buffer means which connect the two portions of the data bus, and said latch means comprise data latch means which connect from the data bus portion of the first bus section to the data bus portion of the second bus section, and the apparatus further comprises address buffer means which connect the two portions of the address bus so as to isolate the address bus portion of the first bus section from the address bus portion of the second bus section but permit the transfer of electrical signals at least from the address bus portion of the first bus section to the address bus portion of the second bus section, digital memory connected between the address bus portion of the first bus section and the data bus portion of the first bus section, and address latch means which connect from the address bus portion of the second bus section to the data bus portion of the second bus section, so as to isolate electrically the address bus portion of the second bus section from the data bus portion of the second bus section but permit the capture by the address latch means of electrical signals from the address bus portion of the second bus section and the application of captured electrical signals to the data bus portion of the second bus section.

5. A method for testing the electrical condition of an electronic circuit that comprises a microprocessor, a first bus section connected to the microprocessor, a second bus section, buffer means having a first side connected to said first bus section and a second side connected to said second bus section so as to isolate electrically said first bus section from said second bus section but permit the transfer of electrical signals both from said first bus section to said second bus section and from said second bus section to said first bus section, the method comprising the steps of
a. conducting a verification test upon a digital memory that is connected to the first bus section and wherein there is stored a body of test data, in order to determine whether the digital memory is properly programmed and whether the microprocessor, the first bus section and the first side of the buffer means are functioning properly;

b. if the verification test confirms that the digital memory is properly programmed and that the microprocessor, the first bus section and the first side of the buffer means are functioning properly, transferring a portion of said test data to the second bus section by way of latch means that connect said first bus section to said second bus section without use of the buffer means, receiving a portion of response data back from the second bus section by way of the buffer means, and comparing said portion of response data to said portion of test data.

6. A method according to claim 5, wherein said first bus section comprises a first address bus portion and a first data bus portion and said second bus section comprises a second address bus portion and a second data bus portion and the buffer means comprise a data buffer that connects the first data bus portion to the second data bus portion and permits the transfer of electrical signals both from the first data bus portion to said second data bus portion and from said second data bus portion to said first data bus portion, and the electronic circuit further comprises an address buffer that connects the first address bus portion to the second address bus portion and permits transfer of electrical signals at least from said first address bus portion to said second address bus portion, and wherein the method further comprises transferring a second portion of test data to the second address bus portion by way of the first address bus portion and the address buffer, capturing a second portion of response data from the second address bus portion by means of an address latch, transferring the second portion of response data from the address latch to the first data bus portion by way of the second data bus portion and the buffer means, and comparing the second portion of response data to the second portion of test data.

7. A method for testing the electrical condition of a bus that comprises first and second bus sections and buffer means that connect the first and second bus sections so as to isolate the bus sections electrically but permit the transfer of electrical signals at least from the second bus section to the first bus section, the method comprising the steps of a. writing a test pattern into latch means that connect the first and second bus sections, said test pattern being written into the latch means without passing through the buffer means, b. reading a response pattern from the latch means onto the second bus section and transferring the response pattern to the first bus section by way of the buffer means, and c. comparing the response pattern as received on the first bus section with the test pattern.

8. A method according to claim 7, wherein the first bus section comprises a first address bus portion and a first data bus portion, the second bus section comprises a second address bus portion and a second data bus portion, and the buffer means comprise a data buffer that connects the first and second data bus portions, and wherein the method further comprises writing a second test pattern into an address latch that connect the second address bus portion and the second data bus portion, reading a second response pattern from the address latch onto the second data bus portion, transferring the second response pattern to the first data bus portion by way of the buffer means, and comparing the second response pattern as received on the first data bus portion with the second test pattern.

* * * * *